United States Patent
Thiessen et al.

(10) Patent No.: US 7,530,657 B2
(45) Date of Patent: May 12, 2009

(54) MEDIA TRANSPORT ENCODER ACCURACY

(75) Inventors: Kurt Thiessen, Escondido, CA (US); Josep-Maria Serra, San Diego, CA (US); Ezekiel Parnow, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 351 days.

(21) Appl. No.: 11/051,173

(22) Filed: Feb. 3, 2005

(65) Prior Publication Data

US 2006/0170723 A1    Aug. 3, 2006

(51) Int. Cl.
B41J 29/38 (2006.01)
B41J 2/01 (2006.01)

(52) U.S. Cl. .......................... 347/16; 347/101; 347/104

(58) Field of Classification Search ................... 347/19, 347/4, 1, 16, 104, 139, 153, 164, 215, 218, 347/217, 264, 5, 101; 358/1.12; 399/3.15, 399/109, 228, 256; 271/388, 396
See application file for complete search history.

(56) References Cited

U.S. PATENT DOCUMENTS

| | | | |
|---|---|---|---|
| 4,284,876 A | 8/1981 | Ishibashi et al. | |
| 4,686,540 A | 8/1987 | Leslie et al. | |
| 4,852,785 A | 8/1989 | Bettendorf et al. | |
| 5,162,815 A | 11/1992 | Hodge | |
| 5,170,257 A | 12/1992 | Burns | |
| 5,281,979 A | 1/1994 | Krogstad | |
| 5,434,602 A | 7/1995 | Kaburagi et al. | |
| 5,493,385 A | 2/1996 | Ng | |
| 5,598,201 A | 1/1997 | Stodder et al. | |
| 5,815,091 A | 9/1998 | Dames et al. | |
| 5,889,534 A | 3/1999 | Johnson et al. | |
| 6,023,285 A | 2/2000 | Kocher et al. | |
| 6,034,705 A | 3/2000 | Tolle et al. | |
| 6,088,050 A | 7/2000 | Ng | |
| 6,220,686 B1 | 4/2001 | Ludi et al. | |
| 6,967,729 B1 * | 11/2005 | Iwamura | 358/1.12 |
| 7,014,378 B2 * | 3/2006 | Saito et al. | 400/582 |
| 2004/0046820 A1 | 3/2004 | Wu et al. | |
| 2004/0075708 A1 * | 4/2004 | Arakawa | 347/19 |
| 2004/0179217 A1 | 9/2004 | Chapman et al. | |

FOREIGN PATENT DOCUMENTS

EP    1104161    5/2001
EP    1447230    8/2004

OTHER PUBLICATIONS

European Search Report dated Jun. 20, 2007.

\* cited by examiner

*Primary Examiner*—Stephen D Meier
*Assistant Examiner*—Rene Garcia, Jr.

(57) ABSTRACT

In an embodiment, a first signal is generated in response to movement of a media transport assembly and a second signal is generated.

63 Claims, 5 Drawing Sheets

MEDIA TRANSPORT ENCODER ACCURACY

BACKGROUND

Encoders may be use in print applications to measure distances traveled by a print medium. However, encoders may have an associated encoder distance error. These encoder distance errors, which are a function of encoding accuracy, may lead to visible print quality defects (stitching errors) in applications using adjacent printheads, where the swaths of adjacent printheads touch at the stitch lines. Similar errors result from encoders using the conveyor belt.

BRIEF DESCRIPTION OF THE DRAWINGS

Embodiments of the present disclosure will be described referencing the accompanying drawings in which like references denote similar elements, and in which.

DETAILED DESCRIPTION OF EMBODIMENTS OF THE INVENTION

Embodiments of the present disclosure include, but are not limited to, an imaging device and method which include a distance-tracking encoder for generating a first signal, such as a plurality of relatively high-resolution first timing pulses, to track in fine increments the movement a media transport assembly positioned under one or more printheads. A controller, in response to the first timing pulses and a plurality of pulse select numbers accessed from a memory, generates a second signal, such as a plurality of relatively low-resolution second timing pulses, for use in firing one or more printheads and/or for driving the media transport assembly. The controller may use the accessed pulse select numbers to select (detect) a subset of the received first timing pulses. In the case of periodic distance errors of the distance-tracking encoder, the selected subset of the first timing pulses may be used to generate the second timing pulses so that they measure more uniformly sized distances moved by the media transport assembly. Linear distance errors of the distance-tracking encoder may also be reduced by the controller selecting a subset of first timing pulses to generate a desired number of second timing pulses per unit movement of the media transport assembly. Embodiments of the present disclosure also include, but are not limited to, a calibration system and method to generate pulse select numbers for the memory.

In the following description, various aspects of the illustrative embodiments of the present disclosure will be described. However, it will be apparent to those skilled in the art that other embodiments of the present disclosure may be practiced with some or all aspects described. For purposes of explanation, specific numbers, materials and configurations are set forth in order to provide a thorough understanding of these embodiments of the present disclosure. However, it will be apparent to one skilled in the art that various embodiments of the present disclosure may be practiced without the specific details. In other instances, features understood by those in the art are omitted or simplified in order not to obscure the disclosed embodiments of the present disclosure.

The phrase "in one embodiment" is used repeatedly. The phrase generally does not refer to the same embodiment, however, it may. The terms "comprising", "having" and "including" are synonymous, unless the context dictates otherwise.

Figure 1:
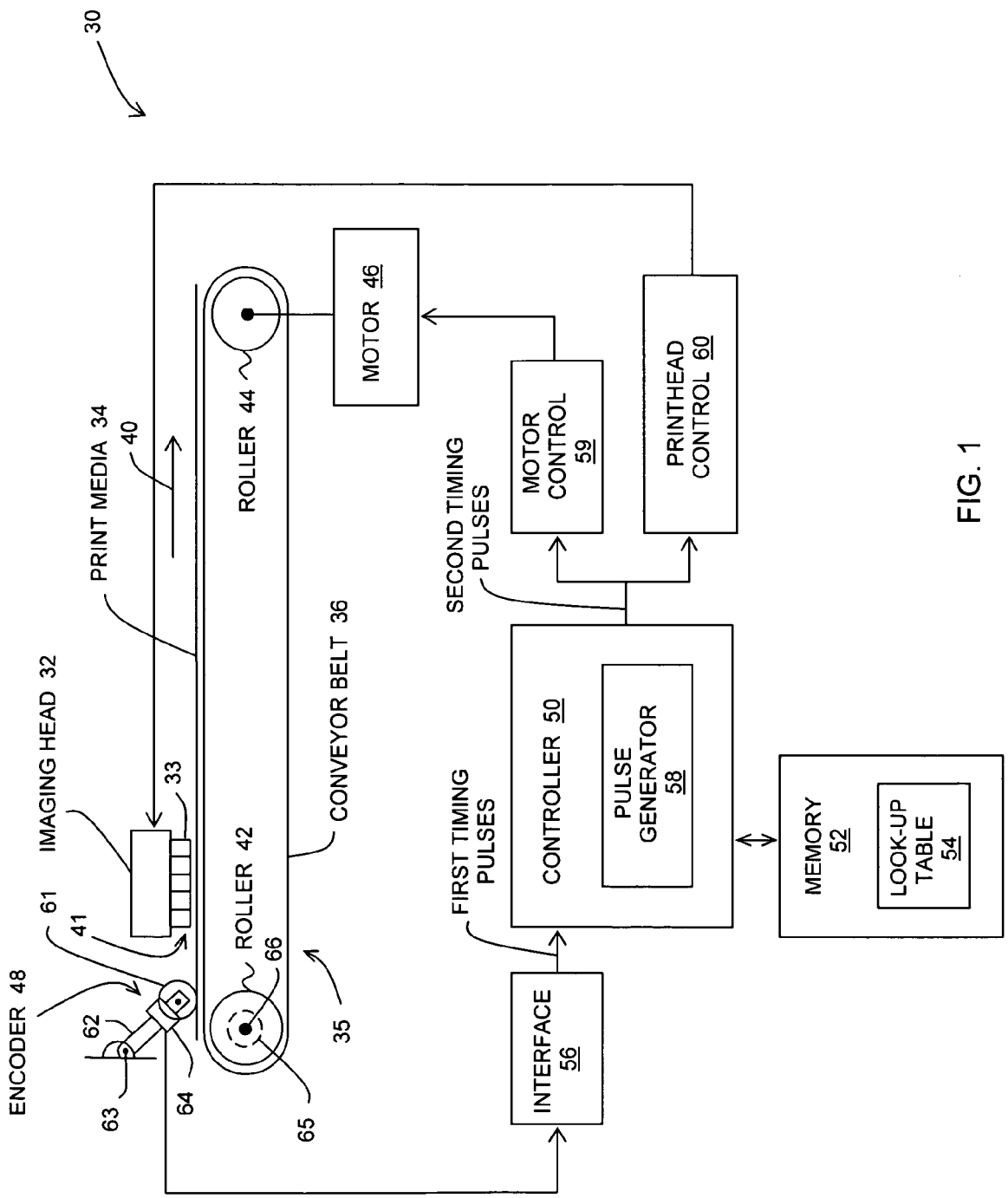
FIG. 1 illustrates a diagram of an embodiment of an imaging device according to one embodiment of the present disclosure.

Referring to FIG. 1, there is illustrated an imaging device 30, according to one embodiment of the present disclosure. The imaging device 30 may include an imaging head 32 having one or more printheads 33 for page-wide printing, wherein the printheads 33 may extend across a substantial portion of the width of media, such as print media 34. In one embodiment, the imaging head 32 may include five inkjet printheads 33, which may be arranged and configured in a staggered manner. An illustrated, media transport assembly 35 may include an endless-loop, conveyor belt 36 for moving the print media 34 in a media flow direction 40 through a print zone 41 under the imaging head 32. The belt 36 may be movably mounted over two belt rollers 42 and 44. One or both of the rollers 42 and 44 may be selectively motor-driven by a motor 46 in either a clockwise or counter-clockwise direction (clockwise is shown in FIG. 1) to move the print media 34 through the print zone 41 and under the imaging head 32. A vacuum hold-down mechanism (not shown) may be used to hold the print media 34 to the moving conveyor belt 36. As previously explained, the position of the belt 36 in the printing zone 41 at a given time relative to printheads 33 may affect the quality of image formation.

A distance-tracking encoder 48 with relatively high resolution generates a train of first timing pulses to provide position data on movement of the media 34 and the conveyor belt 36. A controller 50 may be configured to provide control logic for the imaging device 30. The controller 50 may be implemented by a microprocessor, a micro-controller, an application specific integrated circuit (ASIC), and the like. The controller 50 may interface with a memory 52, which provides storage for data and computer programs that may be executed by the controller 50 to provide the functionality of the imaging device 30. In one embodiment, a look-up table 54 may be resident (i.e. stored) in the memory 52 and may contain a plurality of pulse select numbers which are used by the controller 50 to select a subset of the first timing pulses with desired pulse timings to correct for encoder distance errors. The first timing pulses from the encoder 48 may be provided to the controller 50 through an input/output (I/O) interface 56. In one embodiment, the controller 50 may include a pulse generator 58 for generating the plurality of second timing pulses.

The second timing pulse train may drive the motor 46 through a motor control 59 and may fire the printheads 33 of the imaging head 32 through a printhead control 60. The motor control 59 may be an electronic governor to controls the speed of motor 46. The electronics of the printhead control 60 may control various printing system functions, such as activation of the printheads 33 to dispense ink. The second timing pulses also may be used by any other device that makes use of positional feedback. In summary, the second timing pulse train may be used to trigger events indexed to motion in the imaging device 30.

In the imaging device 30 according to the various embodiments of the present disclosure, the encoder 48 does not directly generate the timing pulse train for operating the printheads 33 and/or the motor 46. The imaging device 30, utilizes the controller 50 to generate a second series of second timing pulses for operating the printheads 33 and/or the motor 46. The encoder 48 may have a substantially higher resolution in generating the first timing pulses than the resolution of the second timing pulses for operating the printheads and motors. For example, if the second timing pulse train has a timing pulse resolution of 150 pulses-per-inch for driving the printheads and motor, then the encoder 48 may provide the first timing pulses at a timing pulse resolution of 1500 pulses-per-inch, a factor of 10 times greater. As will become apparent hereinafter in the description of a calibration process of FIGS. 4-6, the increased pulses-per-inch of the encoder 48 may allow for increased resolution in correcting for the encoder distance errors. In other words, the amount of correction possible at least in part is a function of the resolution or pulses-per-inch of the encoder 48.

A user of the imaging device 30 may choose whatever resolution is desirable to achieve a desired accuracy for a particular application. Although the encoder 48 and the first timing pulses are referred to as having "high resolution" and the second timing pulses are referred to as having "low resolution", these are intended to be relative terms. In general, the plurality of second timing pulses has a resolution which is less than the resolution of the first timing pulses. The term "lines-per-unit-movement" is a generic term describing line/dot resolution which includes "lines-per-inch" and other distance measurement systems, such as the metric system.

The encoder 48, according to the various embodiment of the present disclosure, may be characterized as being "overclocked". The pulse select numbers of the look-up table 54, generated by the calibration process described hereinafter, determine which first timing pulses are used to trigger a second timing pulse and which are not used. More specifically, the encoder 48 generates a predetermined group (referred to as the "run-out group") of first timing pulses during each revolution of the encoder wheel or conveyor belt (referred to as the "runout"), depending on the type of encoder 48 as will be described hereinafter. The run-out of the encoder 48 may begin with aligning the starting indicium (e.g., mark) of the encoder 48 (e.g., mark on the encoder wheel) to a predetermined position or reference point relative to the encoder's sensor. This starting alignment of the encoder 48 may be used for generating the first one of the first timing pulse (first count) of the predetermined (run-out) group of first timing pulses. After one revolution, the predetermined (run-out) group of first timing pulses repeats beginning again with the first count generated at the starting indicium.

The pulse select numbers are accessed from the look-up table 54 by the controller 50. The controller 50 uses the pulse select numbers to select a subset of a run-out group of received first timing pulses. The subsets of first timing pulses are selected to at least partially compensate for encoder measuring errors, in that the selected subsets are used to generate the desired number of second timing pulses and/or the second timing pulses with desired, error-reducing positions determined during the calibration process. The controller 50 uses the selected subset to generate the second timing pulses. In the various embodiments discussed hereinafter, there may be a one-to-one correspondence between the selected first timing pulses and the second timing pulses. The non-selected first timing pulses are not used by the controller 50 to trigger second timing pulses. Stated differently, the controller 50 may receive a certain number of first timing pulses and use the look-up table 54 to generate the desired number of second timing pulses positioned to reduce the encoder measuring errors.

The distance-tracking encoder 48 may take many different forms, three of which are discussed below. Also, there may be different sources for encoder distance errors, depending upon the type of encoder. As shown in FIG. 1, in one embodiment the encoder 48 may include a follower encoder wheel 61. The encoder wheel 61 may be connected to an arm 62 pivotally connected to a fixed portion of the imaging device 30 at a mounting point 63 shown symbolically for clarity. In one embodiment, the arm 62 may be spring biased or gravity biased downward lightly against the print media 34 to permit wheel 61 to roll with the motion of the print media 34 without substantial sliding. A sensor 64 may be connected to the arm 62 adjacent the wheel 61. Beginning at a starting indicium, angular displacement of the encoder wheel 61, as it rotates through the sensor 64, generates the first timing pulses. For example, the encoder wheel 61 may be a slotted timing disk which includes optical markings or a pattern of transparent and opaque regions so that an emitter and a detector of the sensor 64 may detect incremental movement of the wheel 61. The encoder wheel 61 may employ any suitable alternative means of measuring surface movement, including encoder wheels with magnetic transducers. In one embodiment, the sensor 64 may include a waveform shaping circuit to convert motion of the wheel 61 to the first timing pulse train, which is a controlled series of electrical pulses. In this embodiment of the encoder 48, encoder distance errors may be generated from an inaccurate diameter of the encoder wheel 61 or eccentricities in the surface of the encoder wheel 61 that causes it to deviate from a perfect cylindrical shape. The encoder wheel 61 may be set so that the starting indicium generates the first timing pulse (first count) of the run-out group of first timing pulses and one complete rotation of the encoder wheel generates the run-out group of the first timing pulses.

In another embodiment of the encoder 48, an encoder wheel 65 (shown by dashed circle in FIG. 1) may be mounted directly (or indirectly through a gear train) to an axle or shaft 66 for one of the rollers 42 or 44 (shown attached to roller 42 in FIG. 1). The motor 46 and the rollers 42 and 44 advance together to move the conveyor belt 36 with the print media 34 longitudinally in the direction of media flow direction 40 and through the printing zone 41 under the imaging head 32. As with the prior embodiment, the encoder wheel 65 may have a sensor (not shown), such as the previously described sensor 64, to generate the series of first timing pulses in response to movement of the encoder wheel 65. In this embodiment of the encoder 48, encoder distance errors may be generated from an inaccurate diameter of the roller 42 or eccentricities in the surface of the roller 42 that causes it to deviate from a perfect cylindrical shape.

In yet another embodiment of the encoder 48, the encoder 48 may use timing indices (not shown) on the belt 36. For example, these timing indices may comprise timing marks or regularly spaced perforations in the belt 36. A sensor (not shown), similar to the previously described one, may be positioned in an adjacent, stationary relationship to the moving belt 36 to sense the timing indices and to generate the first timing pulses in response to movement of the belt 36. In this embodiment of the encoder 48, encoder distance errors may be generated from an inaccurate diameter of the rollers 42, 44 or eccentricities in the surface of the rollers 42, 44 that cause it to deviate from a perfect cylindrical shape or from inaccuracies in the placement of the timing indices.

In summary, the encoder 48 tracks the motion of the print media 34 either directly (on the media itself) or indirectly (by tracking a roller, belt or like mechanism). Regardless of the type of encoder, the encoder 48 generates the series of first timing pulses, which may also be referred to as encoder ticks or counts. These first timing pulses are indexed to the motion of the print media 34 so that each pulse generated is translated to the movement of a specific distance of the print media 34.

Sources of encoder distance errors are now described in more detail. First, there may be linear errors caused by a diameter inaccuracy of the encoder wheel or belt roller. For example, in the case of a diameter being too small, it may cause an encoder to yield a larger number of pulses per unit of movement than the number for which it was designed. Second, there may be periodic or run-out errors in the encoder pulses-per-inch due to eccentricities at various places around the circumference of the encoder wheel or belt roller. As one example, eccentricities in the circumference may be caused by soft spots in a rubber coating or a flat area on the outside of a follower encoder wheel. For example, such eccentricities in the circumference may result in an encoder output varying within a range around the designed number of encoder pulses per unit of movement. In summary, encoding accuracy is significantly affected by the diameter and runout of the belt roller, measuring encoder wheel, or belt. As will be described hereinafter, the imaging device 30, in accordance with various embodiments of the present disclosure, may at least partially correct for linear and/or periodic distance errors.

Two illustrative embodiments of the controller 50 and look-up table 54 are described hereinafter. With both embodiments, the controller 50 receives the first timing pulses from the encoder 48 in the form a digital signal. More specifically, the first timing pulses in digital form are fed from the encoder 48 through the I/O interface 56 and to the controller 50.

Figure 2:
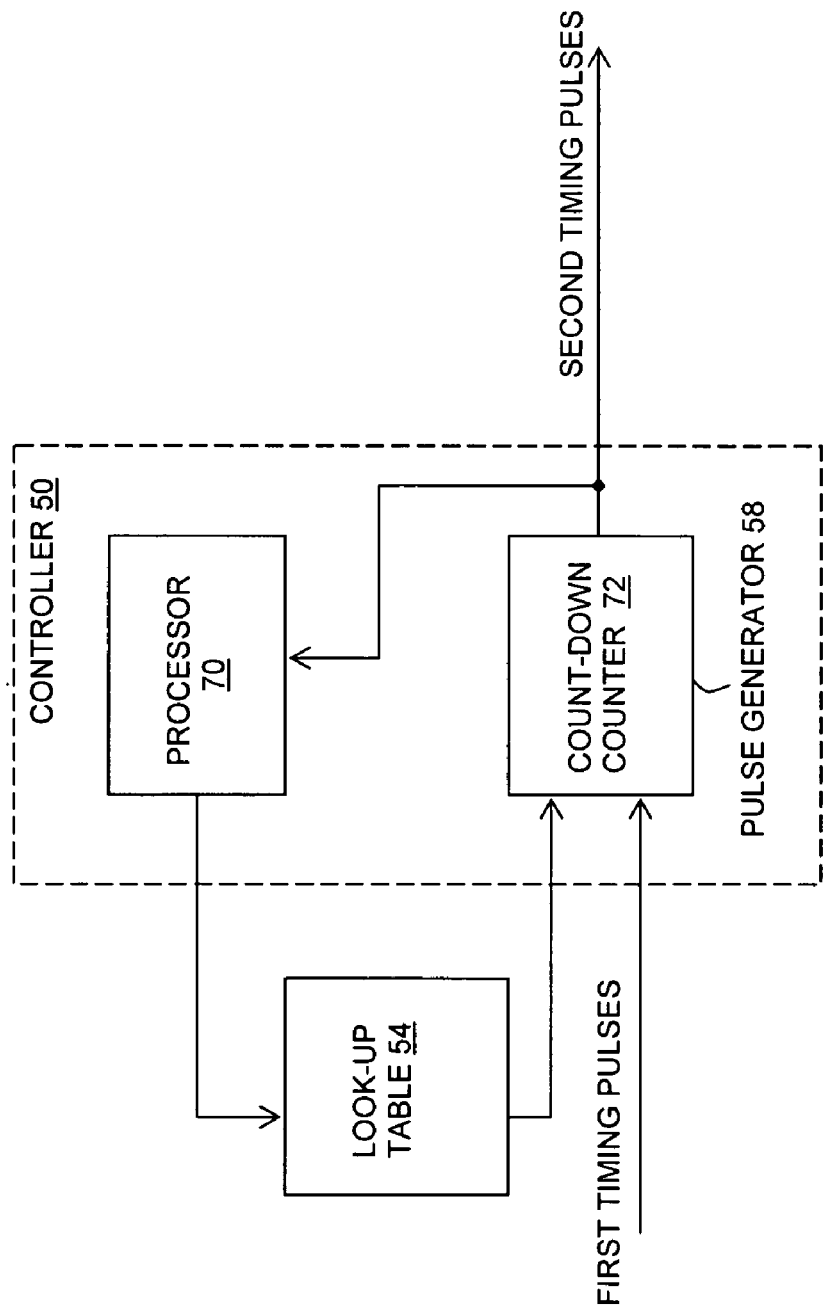
FIG. 2 is a block diagram of one embodiment of a controller for the imaging device of FIG. 1 according to one embodiment of the present disclosure.

Referring to FIG. 2, a first embodiment of the controller 50 and the look-up table 54 is shown. The controller 50 may include a processor 70 and the pulse generator 58, which may be in the form of a programmable, binary countdown counter 72. The previously-described run-out group of first timing pulses generated during each encoder revolution may be defined to be subdivided into a plurality of consecutive subgroups of the first timing pulses within the run-out group of first timing pulses, beginning with the starting indicium. Hence, for this embodiment, the "pulse select numbers" define the numbers of the first timing pulses within the subgroups, with there being one pulse select number associated with each subgroup. In this embodiment, the pulse select numbers become preloaded "pulse counts" for the counter 72. The counter 72 is incremented down by the received first timing pulses from one of the pulse select numbers to zero. Upon reaching zero, the pulse select number may be characterized as identifying a specific first timing pulse which is used to generate a second timing pulse. The pulse select numbers of the subgroups of the run-out group of first timing pulses, as a whole, may be used to define the subset of the first timing pulses selected from the run-out group. In another embodiment, a counter may be incremented up from zero to the pulse select number.

In operation, the processor 70 may address the look-up table 54 to cause it to initially preload the counter 72 with the first pulse select number (which is zero). With the receipt of the first timing pulse generated from the encoder 48 of FIG. 1 at the reference point (starting indicium or mark), the counter 72 may provide an output signal in the form of the first one of the second timing pulses. This second timing pulse also may be sent to the processor 70. Upon receipt of the second timing pulse, the processor 70 may again address the look-up table 54 to cause it to load the counter 72 with the next, consecutive pulse select number in the look-up table 54 for the next subgroup of predetermined first timing pulses. As the counter 72 receives each of the first timing pulses of this subgroup from the encoder 48 of FIG. 1, the counter 72 may be decremented down to zero, at which point the counter 72 may generate the next one of the second timing pulses. This process may be repeated for each subgroup of the run-out group of first timing pulses and then the entire process may be repeated for the next run-out group beginning again at the starting indicium and so on. In another implementation, a state machine may be used for the processor 70. In summary, upon the number of received first timing signals equaling the loaded pulse select number, the counter 72 may generate as an output one of the second timing pulses.

It should be noted that the programmable counter 72 performs two functions. First, it acts as a counter in that counts the received first timing pulses. Second, it acts as a comparator in that it determines when the pulse count equals the pulse select number so as to cause the controller to generate one of the second timing pulses. In this embodiment, the pulse count may be referred to as the "subset pulse count".

Referring back to FIG. 1, another embodiment of the controller 50 and table 54 is described, wherein the "pulse select numbers" may be unique numbers consecutively assigned to each of the first timing pulses within the run-out group. In other words, the run-out group of first timing pulses is not divided into subgroups, as described above. The controller 50 may include a processor operating a stored computer program having a software counter routine. The software counter routine may be incremented by receipt of each of the first timing pulses so as to provide an accumulative count number for all the first timing pulses of the run-out group. In this embodiment, the software counter routine is reset after the accumulative count number of the software counter equals the number of the first timing pulses in the run-out group. Consequently, the pulse selection numbers in the look-up table 54 include a subset of accumulative count numbers correlating with the subset of first timing pulses to be selected to generate the second timing pulses. Each time the accumulative count number of the software counter routine is incremented by the receipt of one first timing pulse, a comparing routine may be used to compare the accumulative count number with the lowest pulse select number until that pulse select number is reached. Upon that pulse select signal being reached, the processor may cause the pulse generator 58 to generate one of the second timing pulses. After that, the incremented accumulative count number is compared with the next lowest pulse select number until it is reached and so on.

Illustrative controller 50 and table 54 embodiments, with their associated pulse select numbers, will now be described for three encoder conditions: a perfect encoder; an encoder wheel or roller with an inaccurate diameter, and an encoder wheel or roller with an eccentricity in its surface or circumference. The above two described embodiments of the controller 50 and table 54 may be used with all three of these conditions, which will be referred to as the "programmable counter embodiment" and the "software counter embodiment".

For the illustrative condition of a perfect encoder, assume that the encoding wheel 61 in FIG. 1 has a 12 inch circumference; a first resolution of 1500 pulses/in for the encoder 48, and a second resolution of 150 pulses/in for the pulse generator 58. In this example, the encoder 48 may generate (12 in)(1500 pulses/in)=4500 first timing pulses per revolution (one run-out). In the programmable counter embodiment, the predetermined run-out group of 4500 first timing pulses may be divided into 450 subgroups of 10 first pulses each. For each subgroup, the pulse select number would be 10 pulses. As the controller 50 processes the first timing pulses, it accesses the look-up table 54 to determine for that a given subgroup has 10 pulses and loads the programmable counter. Upon receiving the 10 first timing pulses in the given subgroup, the pulse generator 58 generates one of the second timing pulses and the counter is reset. In the software counter embodiment, the second timing pulses are generated when the accumulative pulse count is 0, 10, 20, 30, 40, 50 and so forth to 4500. With both embodiments, each predetermined run-out group of evenly spaced 4500 first timing pulses generates a group of evenly spaced 450 second timing pulses. In summary, regardless of which embodiment, the pulse select numbers of the look-up table 54 may cause the controller to generate one second timing pulse for every 10 first timing pulses from the encoder 48.

For the illustrative condition of an inaccurate diameter, assume that the diameter is 5 percent too small in the system described above for the first encoder condition. With respect to the programmable counter embodiment, the pulse select numbers may alternate between 10, 11, 10 and so forth. Hence, the controller 50 may cause the pulse generator 58 to alternate between generating 1 second timing pulse after 10 first timing pulses and generating 1 second timing pulse after 11 first timing pulses. In this example, the imaging device 30 corrects the encoding measuring error to within 1 second timing pulse-per-inch, rather than the 7.5 second timing pulses-per-inch that would exist in an uncorrected system.

For the illustrative condition of eccentricities in the circumference of the wheel or roller, this type of error may be corrected with a more complicated look-up table 54 of FIG. 1. Such an illustrative look-up table 54 is shown in TABLE I below, along with the actual distances traveled by the encoder (referred to as Actual Distances), which are calculated by the calibration process to be described hereinafter with respect to FIGS. 4-6. In general, the encoder 48 may be indexed to the reference point, e.g., the previously described starting indicium, during the system setup of the imaging device 30. In this example of the lookup table 54, the encoder 48 generates 100 first timing pulses per revolution (one runout beginning with the starting indicium). As shown in the first column of the TABLE I, each of the first timing pulses is associated with or represents a "Measured Distance" from the starting indicium. These Measured Distance values presuppose no encoder distance error and therefore that the 100 first timing pulses evenly divides the encoder wheel or belt roller into a 100 equal distance increments.

In this example, the encoder 48 would, with no encoder distance errors, generate 10 first timing pulses per revolution to measure 10 equal distance increments. With no encoder distance errors, the pulse generator 58 normally would generate one second timing pulse for every 10th first timing pulse. But with periodic distance errors, these 10 second timing pulses no longer measure equal distance increments. In the calibration process described hereinafter, "Actual Distance" values are determined for each of the first timing pulses, which are the distances actually traveled by the paper media by the occurrence of each first timing pulse. These Actual Distance values are shown by the center column in TABLE I. By using the Actual Distance values, it is possible to select 10 of the first timing pulses which measure more equal distance increments than can be achieved by using the Measured Distance values to select the first timing pulses. This selection of first timing pulses in effect adjusts the timing of the second timing pulses to make the distances measured by the second timing pulses more equal.

In TABLE I, those first timing pulses in the Measured Distance column that are underlined (e.g., 0, 10, 20, 30, 40 and so on) would be used if there is no encoding error or no ability to calibrate the encoder. Those Actual Distance values in the Actual Distance column that are underlined (e.g., 0, 10.40765177, 20.22027366, 29.99999841 and so on) are distances of the first timing pulses that are the most equal in length. Hence, the first timing pulses associated with these Actual Distances (e.g., 0, 8, 16, 25 and so on) are used instead so as to increase the accuracy of the encoding system. In the programmable counter embodiment, the look-up table 54 could be implemented to include the third column, the Pulse Select Numbers (e.g., 0 pulses, 8 pulses, 8 pulses, 9 pulses and so on). Hence, each Pulse Select Number may specify the number of first timing pulses that are to be received before a second timing pulse is generated. Consequently, in this example each Pulse Select Number selects one of the first timing pulses that may be identified by the Measured Distance values 0 through 100.

TABLE I

| Measured Distance | Actual Distance | Pulse Select Number says: |
|---|---|---|
| 0 | 0 | Use this pulse |
| 1 | 1.313793646 | |
| 2 | 2.626350148 | |
| 3 | 3.936437236 | |
| 4 | 5.242832379 | |
| 5 | 6.5443276 | |
| 6 | 7.839734243 | |
| 7 | 9.127887652 | |
| 8 | 10.40765177 | Output pulse 8 pulses after the last pulse |
| 9 | 11.67792362 | |
| 10 | 12.93763763 | |
| 11 | 14.18576988 | |
| 12 | 15.42134209 | |
| 13 | 16.6434255 | |
| 14 | 17.85114456 | |
| 15 | 19.0436803 | |
| 16 | 20.22027366 | Output pulse 8 pulses after the last pulse |
| 17 | 21.3802284 | |
| 18 | 22.5229139 | |
| 19 | 23.64776762 | |
| 20 | 24.7542973 | |
| 21 | 25.84208296 | |
| 22 | 26.91077849 | |
| 23 | 27.96011307 | |
| 24 | 28.98989218 | |
| 25 | 29.99999841 | Output pulse 9 pulses after the last pulse |
| 26 | 30.99039194 | |
| 27 | 31.96111063 | |
| 28 | 32.91226991 | |
| 29 | 33.84406236 | |
| 30 | 34.75675688 | |
| 31 | 35.65069768 | |
| 32 | 36.52630289 | |
| 33 | 37.38406296 | |
| 34 | 38.22453867 | |
| 35 | 39.04835894 | |
| 36 | 39.85621838 | Output pulse 11 pulses after the last pulse |
| 37 | 40.64887452 | |
| 38 | 41.4271448 | |
| 39 | 42.19190341 | |
| 40 | 42.94407781 | |
| 41 | 43.68464505 | |
| 42 | 44.41462796 | |
| 43 | 45.13509109 | |
| 44 | 45.84713653 | |
| 45 | 46.55189955 | |
| 46 | 47.25054414 | |
| 47 | 47.9442584 | |
| 48 | 48.63424989 | |

TABLE I-continued

| Measured Distance | Actual Distance | Pulse Select Number says: |
|---|---|---|
| 49 | 49.32174082 | |
| 50 | 50.00796326 | Output pulse 14 pulses after the last pulse |
| 51 | 50.69415432 | |
| 52 | 51.38155118 | |
| 53 | 52.07138631 | |
| 54 | 52.76488253 | |
| 55 | 53.46324826 | |
| 56 | 54.16767271 | |
| 57 | 54.87932118 | |
| 58 | 55.59933052 | |
| 59 | 56.32880461 | |
| 60 | 57.06881 | |
| 61 | 57.82037174 | |
| 62 | 58.58446931 | |
| 63 | 59.36203275 | |
| 64 | 60.15393904 | Output pulse 14 pulses after the last pulse |
| 65 | 60.96100859 | |
| 66 | 61.78400205 | |
| 67 | 62.62361126 | |
| 68 | 63.48048656 | |
| 69 | 64.35517423 | |
| 70 | 65.24817434 | |
| 71 | 66.15990872 | |
| 72 | 67.09072538 | |
| 73 | 68.04089707 | |
| 74 | 69.01062025 | |
| 75 | 70.00001427 | Output pulse 11 pulses after the last pulse |
| 76 | 71.00912095 | |
| 77 | 72.0379044 | |
| 78 | 73.08625113 | |
| 79 | 74.15397052 | |
| 80 | 75.24079561 | |
| 81 | 76.34638406 | |
| 82 | 77.4703196 | |
| 83 | 78.61211361 | |
| 84 | 79.77120705 | Output pulse 9 pulses after the last pulse |
| 85 | 80.94697269 | |
| 86 | 82.13871757 | |
| 87 | 83.34568573 | |
| 88 | 84.56706118 | |
| 89 | 85.80197114 | |
| 90 | 87.04948948 | |
| 91 | 88.30864033 | |
| 92 | 89.57840198 | Output pulse 8 pulses after the last pulse |
| 93 | 90.8577109 | |
| 94 | 92.14546588 | |
| 95 | 93.44053244 | |
| 96 | 94.74174727 | |
| 97 | 96.04792282 | |
| 98 | 97.35785198 | |
| 99 | 98.67031283 | |
| 100 | 99.98407349 | Output pulse 8 pulses after the last pulse |

In this simplified example, since the Measured Distances are integers, they may also be used as the previously-mentioned "accumulative count numbers" for uniquely identifying each of the first timing pulses of the previously-described group of the first timing pulses in a runout. Therefore, for the purposes of explanation, the Measured Distance values of the first column may be considered to be the "accumulative count numbers" for the software counter embodiment. In this software counter embodiment, what would be specified in the look-up table is the pulse select numbers in the form of the accumulative count numbers (e.g., 0, 8, 16, 25 and so on).

In summary, the imaging device 30 may correct for non-random errors, such as linear distance errors caused by an incorrect diameter error (i.e., linear error) and/or for periodic distance errors caused by the previously-described eccentricities in the circumference of the follower encoder wheel or belt roller. As will be described respect to FIGS. 4-6, the pulse select numbers stored in the look-up table 54 of FIG. 1 are previously generated by a calibration process. The calibration process calculates the Actual Distances of Table I above and then uses the Actual Distances to determine the pulse select numbers, which in turn select the desired subset of the first timing pulses.

Figure 3:
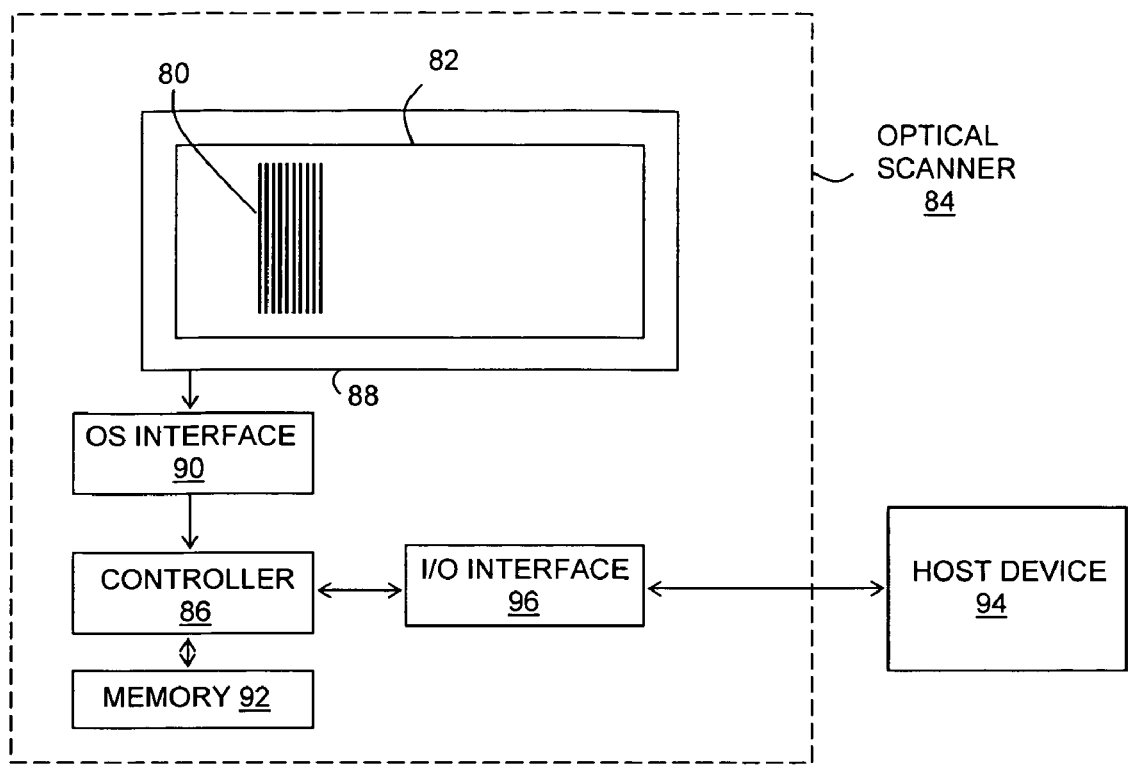
FIG. 3 illustrates a diagram of an embodiment of a calibration system for use in a calibrating process for the imaging device of FIG. 1 according to one method of the present disclosure.

Referring to FIG. 3, an overview of the calibration system and process is provided. The calibration process may begin with printing a high resolution calibration pattern 80 on a media 82 that is representative of a pattern printed by a substantially perfect encoder. The media 82 then may be taken to a calibrated optical scanner 84 and the error of the system characterized. This characterization may be used to generate the pulse select numbers of the look-up table 54 of FIG. 1 to mitigate or eliminate the encoding errors. The calibration process also may be used to correct for degeneration over time by generating a new values for the look-up table. An example of such degradation would be encoder wheel wear that reduces the diameter of the encoder wheel. The optical scanner (OS) 84 may include a controller 86 which interfaces with a flat plate scanning platform 88 via an OS interface 90. The scanner 84 also includes a memory 92 and may be coupled to a host processor device 94 via an I/O interface 96.

As will become clear in the following discussion, the more granularity (higher resolution) incorporated into the calibration process, the smaller the defect for which a correction may be made. Correction for a systematic error due to the encoder wheel or belt roller being too small or too big could be accomplished without using fine granularity, but if there are small eccentricities in the circumference of the encoder wheel or belt roller, such as a little flat spot that allows the encoder pulses to be off by two pulses per revolution for example, then the granularity of calibration down at that two pulse level would be used.

Figure 4:
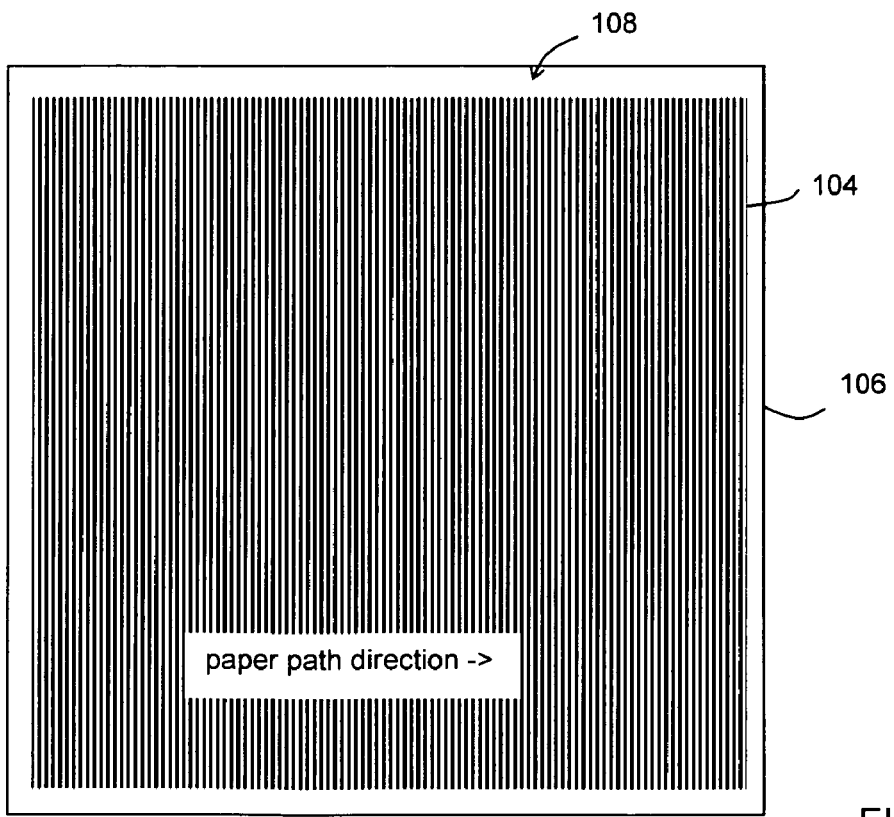
FIG. 4 illustrates an embodiment of a calibration pattern for use with the calibration process shown in FIG. 5.
Figure 5:
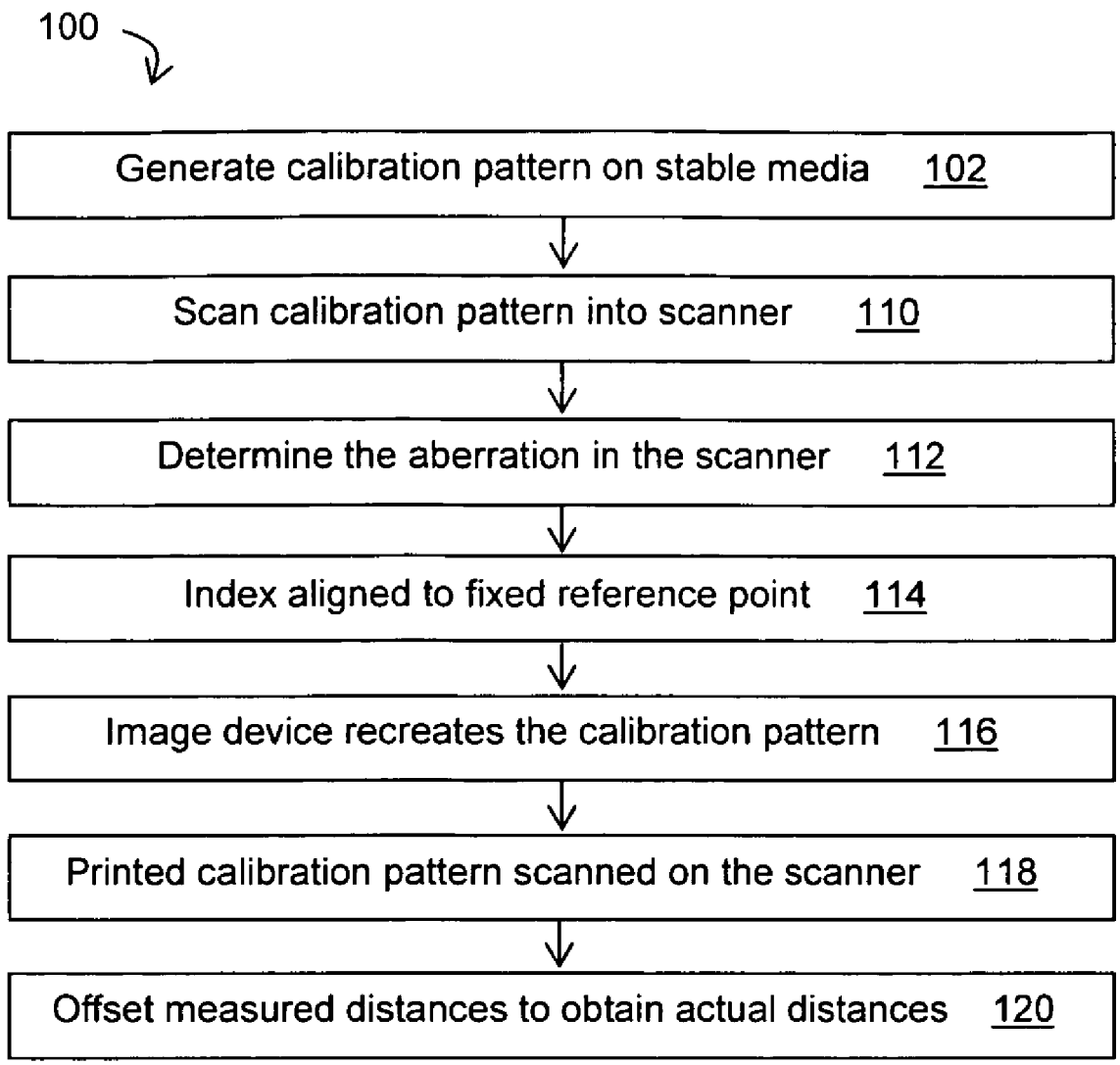
FIG. 5 illustrates a flow chart of an embodiment of a calibration process according to one method of the present disclosure.

Referring to FIGS. 4 and 5, there is illustrated a flow chart of the calibration process 100 used for generating the pulse select numbers for the look-up table 54 of FIG. 1. At a pattern-generating stage 102, a photolithographic or other high precision imaging technique may be used to create a series of parallel media calibration lines 104 on a piece of stable media 106, such as plastic or glass. This is identified as the calibration pattern 108. The horizontal length of the array of media calibration lines 104 in the calibration pattern 108 may be at least equal to or larger than the length of the circumference of the follower encoder wheel or belt roller, depending upon the type of encoder 48 (see FIG. 1) used. For example, the array of media calibration lines 104 may be twice as long as the circumference of the follower encoder wheel so that the linear and periodic distance errors may be more easily separated from any random errors. Since these media calibration lines 104 of the calibration pattern 108 are used to calibrate the encoder, the distance between the lines 104 dictates how small an increment of the encoder's motion may be subjected to a correction. For example, in one embodiment, the lines 104 may be 1/600 wide and spaced every 1/300 of an inch. With these dimensions, it is possible to correct for an encoder distance error down to 1/300 of an inch, since that is the maximum resolution used in this embodiment. For these dimensions, it also follows that the photolithographic technique should be accurate to at least 1/600th of an inch over a length at least equal to the circumference of the encoder wheel or belt roller. In one embodiment having an encoder wheel with a 12" circumference and one line every 1/300 inch, this may result in a calibration pattern with at least (12)(300)=3600 media calibration lines 104.

At a first scanning stage 110, the calibration pattern 108 is precisely laid on the scanner 84 of FIG. 3 so the lines are as close to vertical as practicable. An overlay or precise markings on the glass of the scanner 84 may aid in aligning the calibration pattern on the glass. The calibration pattern 108 is scanned into the scanner to generate a first digital image having a plurality of scanned calibration lines. The scanner resolution may be at least two times the line width of the calibration pattern 108 so that the media calibration lines 104 are easily imaged.

At a scanner calibration stage 112, using either commercially available image manipulation software (like Photoshop™) or custom image analysis software, the aberration in the optical scanner 84 may be determined. More specifically, there is a determination of the location (Dxm) of the scanned calibration lines as measured by the scanner 84 versus the actual location (Dxa) of the media calibration lines 104 on the calibration pattern 108. For each scanned calibration line, an aberration value (Ax) is determined using the formula Ax=Dxa−Dxm. (where x=1 to number of scanned calibration lines). This aberration correction may be applied to any subsequently scanned patterns. The locations Dxm and Dxa are measured from the starting indicium, the marked place on the encoder wheel where the periodic runout starts. To do otherwise will mean that linear variation errors may be corrected for and not periodic variation errors. Because the periodic variations may be different at different points on the circumference of the encoder wheel or belt roller, the error would be indexed to the correct portion of the wheel or roller.

As previously described, the encoder wheel or roller may include the starting indicium, which may be electronic or mechanical. At an indicium alignment stage 114, the starting indicium on the wheel or roller may be aligned with the encoder's sensor or like reference point. The starting indicium may be used to determine where to start the measurement of periodic runout for the circumference of the follower encoder wheel or belt roller.

At a printing stage 116, the imaging device of FIG. 1 recreates the calibration pattern using the unaltered encoder signal to trigger the printing of the lines on a stable media (like plastic based photo media or overhead media). Hence, the first digital image with the plurality of scanned calibration lines is printed using the distance-tracking encoder to generate a printed calibration pattern ("printed pattern") having a plurality of printed calibration lines ("printed lines").

At a second scanning stage 118, the printed pattern now may be scanned on the scanner 84 using care so that the new array of lines is as close as practicable to the position the true calibration pattern was placed on the scanner. The scanning of the printed pattern with the optical scanner generates a second digital image with a plurality of scanned printed lines. Once again using either commercially available image manipulation software (like Photoshop) or custom image analysis software, the encoder distance error (Exa) is determined for each of the media calibration lines by comparing a measured location (Exm) for each scanned printed line to a measured location (Dxa) of each scanned calibration line. The encoder distance error Exa is equal to (Dxa−Exm). However, since the scanner 84 may be calibrated, the actual values used may be: Exa=(Dxm+Ax)−Exm. These calculations generate a table of errors Exa (not shown), with there being one encoder distance error Exa for each media calibration lines 104 of the calibration pattern 108.

In general, the above-described calibration process analyzes the difference between the calibration samples actual lines (the scanned printed lines) and it's theoretical lines (scanned calibration lines), thus generating a table of offsets or encoder distance errors (Exa encoder tracking errors) which may be curve fit or interpolated so that each of the first timing pulses may each have an associated encoder distance error Exa.

At stage 120, the error Exa may be translated into the Actual Distances of the second column of TABLE I above. In other words, referring to TABLE I, the Measured Distances of the first column are offset by its associated encoder distance error Exa to generate the Actual Distances of the second column. As previously described, the pulse train may be at least partially corrected and be more accurate as long as the indexing of the encoder 48 of FIG. 1 is used so that the lookup table starts at the right spot on the measuring wheel or belt roller. Although the Actual Distances may be used to determine the Pulse Select Numbers of the third column, they are not included in the look-up table 54 of FIG. 1.

The error table having the encoder distance errors Exa may contain the errors for each point (each first timing pulse) around the circumference of the encoder wheel or conveyor belt, as the case may be, for one period or revolution. As mentioned above, the number of points is related to how accurately the user wants to correct for an encoder distance error. Taken to extremes, using one mark for the full circumference of the encoder wheel in an embodiment may yield the linear offset of the encoder wheel. In other words, this single mark may correct for the encoder wheel being too big or too small, but not eccentricities at different points on the circumference.

The processing of the look-up table data may be much faster than the data from the pulse generator 58, so that fine adjustments can be made. For example, if the processing of the look-up table is 10 times that of the second timing pulse generation rate, the smallest correction that may be made is 10% of a pulse, so at 150 second timing pulses per inch, it may be possible to correct to $\frac{1}{1500}$ of an inch. The accuracy of the corrected pulse train may be limited by the range of resolution of the scanner 84 used to analyze the calibration plot.

Referring back to FIG. 1, in another embodiment of the encoder 48, the encoder 48 may generate an analog signal. More specifically, the encoder 48 may be an analog sinusoidal encoder. The sinusoidal encoder, instead of generating discrete digital pulses, generates a sinusoidally varying voltage or current signal (without changing polarity) based on, for example, how much of an optical beam is blocked by a clear wheel with a sinusoidal black mark silk screened onto the wheel. Hence, the sinusoidal analog signal may be viewed as a pulsating direct current or voltage with each periodic rise and fall of the analog signal above its minimum value defining one of the first timing pulses. But in this case, the first timing pulses are analog pulses instead of digital pulses. As with the previous embodiments, the controller 50 waits until a number of first timing pulses are received and then trigger the signal generator 58 to create one of the second timing signals. However, in this embodiment, the first timing pulses are analog and the controller 50 is waiting for the voltage or current signal (which may be integrated) to reach a level specified (a voltage or current magnitude number) stored in the look-up table 54 and then the controller 50 triggers the signal generator 58 to create a digital second timing pulse, which in turn triggers the ultimate action (firing an ink drop). In other words, the magnitude number stored in the look-up table may represent a number of analog first timing pulses that are to be received and integrated to trigger a second timing pulse. Hence, the magnitude number represents a subset of the plurality of analog first timing signals or to put it another way, a subset of an analog first signal. Hence, the magnitude number may also be described as a "pulse select number".

Referring back to FIG. 1, with respect to the claims, a "first signal" may be defined to include a digital first signal having a plurality of digital first timing pulses or an analog signal having a plurality of analog first timing pulses, with each analog first timing pulse being defined by the periodic rise and fall of the analog first signal between two positive or two negative values. A "second signal" may be defined as a signal having a plurality of second timing pulses, such as digital second timing pulses. Additionally, the term "number" shall be generic to the above-described "pulse select number" and the above described "magnitude number" representing the voltage level of the analog embodiment, with both the subset select number and the magnitude number being stored in a look up table and both identifying a subset of the first signal (e.g., a subset of the first timing pulses) that when received will be used by the controller in determining when a second timing pulse is to be generated.

Figure 6:
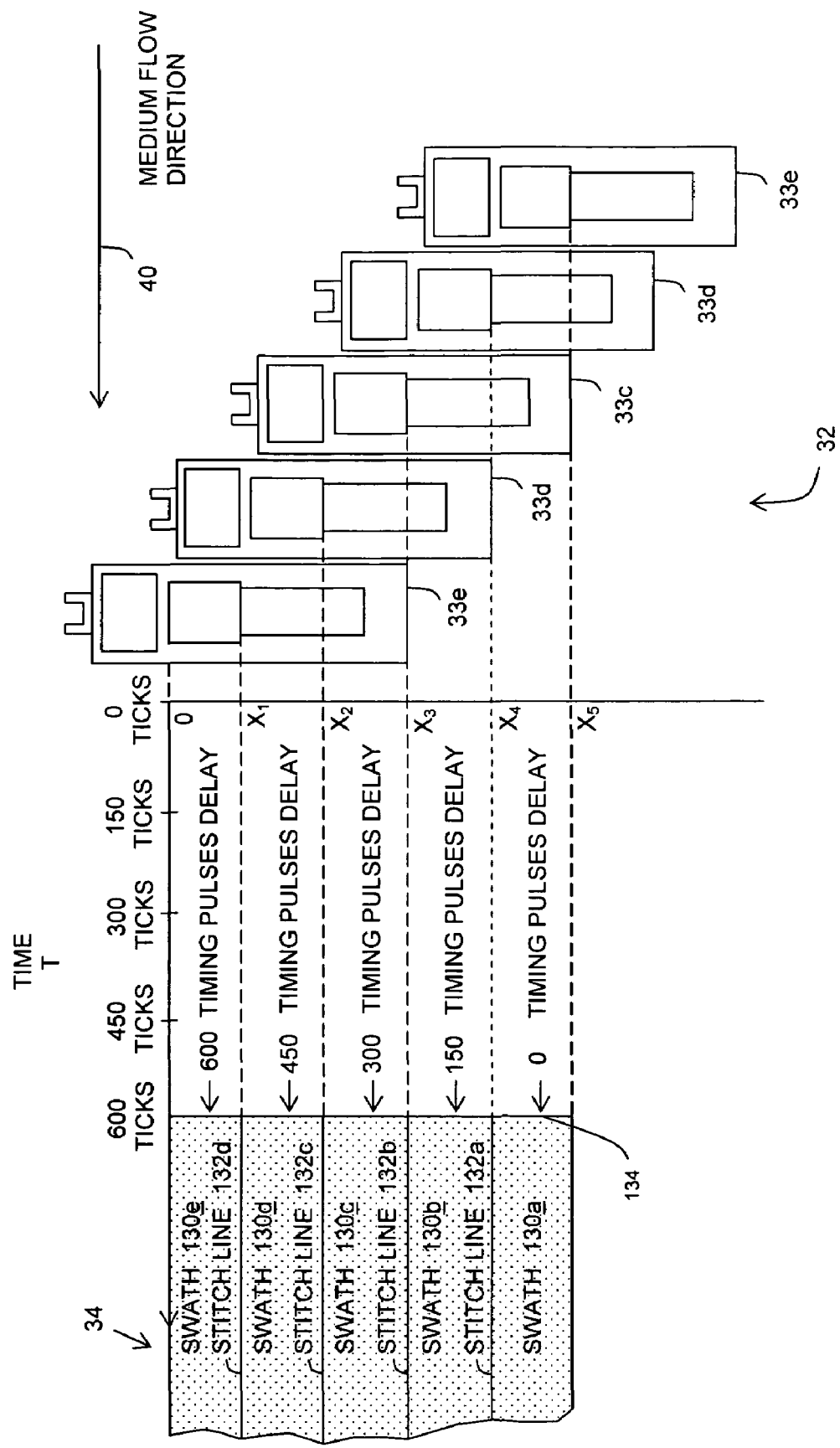
FIG. 6 illustrates a diagram of printheads used in the embodiment shown in FIG. 1.

Referring to FIG. 6, illustrative printheads 33 are shown, which are designated as printheads 33a-33e and are positioned over the print media 34. The printheads 33 may be disposed laterally across and fixed relative to the moving print medium 34, to generate outputs in the form of five swaths 130a-130e that are "stitched" together at stitch lines 132a-132d. By being stationary and staggered along a diagonal, the printheads 33a-33e may achieve a full printing width across a print medium 34, with the print medium 34 being advanced in a direction of the medium flow direction 40. As the print medium 34 passes beneath the printheads 33a-33e, the printheads 33a-33e lay down swaths 130a-130e of ink dots on the print medium 34. The widths of the swaths may be dependent on the lateral staggering (shown by distances $x_1$-$x_5$, e.g., ½ to 1 inch each) of the printheads 33, which are mounted in the image head 34 of FIG. 2 positioned over the print medium 34. As shown by the combined time/distance graph incorporated into FIG. 6, to generate the print image with staggered printheads 33a-33e, the firing of the printheads (i.e. when the printheads print) may be coordinated so that the printheads are printing dots in a single straight line of dots, as illustrated by a sample line 134 at the beginning of the swaths 130. Consequently, the firing times of the printheads 33b-33e may be progressively delayed relative to the firing time of the printhead 33a, with such time delays being translatable to distances that the print medium 34 moves under the printheads. In the illustrative example shown in FIG. 6, the controller 50 of FIG. 2 may provide a 150 second timing pulses-per-inch movement (one pulse or tick every 1/150th of an inch) and the printheads 33a-33e *may be offset relative to the medium flow direction 40 by one-inch spaces* (150 second timing pulses); hence, to align the dots of the five printheads 33a-33e, the firings of the printheads 33b-33e may be delayed by 150, 300, 450, and 600 second timing pulses, respectively, to be able to generate the line 134 of dots. The printheads 33 may take many different forms other than this illustrative example.

Referring back to FIG. 1, the controller 50 may be programmed to advance incrementally the print media 34 using the media drive motor 46. The print media 34 may be any type of suitable material, such as paper, card-stock, transparencies, photographic paper, fabric, mylar, metalized media, and the like. The printheads 33 may emit a single monochrome ink, or the printheads may have multiple ink nozzle arrays for emitting a plurality of inks of different colors, by way of example. With respect to the vacuum hold-down mechanism (not shown), the belt 36 may be in fluid communication with vacuum platen (not shown) by, for example, a plurality of apertures formed through the belt 36. In this manner, a print media 34 may be held against the belt 36 for the span of the length of the platen and may be moved to and through and from the print zone 41.

In one embodiment, the memory 52 may be implemented as a combination of volatile and non-volatile memory, such as dynamic random access memory ("RAM"), EEPROM, flash memory, and the like. In one embodiment, the memory 52 may also be configured to provide a temporary storage area for data/file received by the imaging device 30 from a host device (not shown), such as a computer, server, workstation, and the like. In this embodiment, the controller 50 may further be interfaced with an I/O interface (not shown) configured to provide a communication channel between the host device and the imaging device 30. The I/O interface may conform to protocols such as RS-232, parallel, small computer system interface, universal serial bus, etc. In another embodiment, the memory 52 may be included in the host device.

The imaging device 30 is not limited to use in an ink-jet printer, and has utility for many other applications, including without limitation other types of printers and machines employing media handling systems, including, for example, facsimile machines, scanners, and multi-function machines which combine two or more functions, e.g. print, scan, copy or facsimile.

Thus, it can be seen from the above descriptions, embodiments of an arrangement to adjust timing pulses of an imaging apparatus has been described. While the method has been described in terms of the foregoing embodiments, those skilled in the art will recognize that the method is not limited to the embodiments described. The method may be practiced with modifications and alterations within the spirit and scope of the appended claims.

Thus, the description is to be regarded as illustrative instead of restrictive.

The invention claimed is:

1. An imaging device, comprising:
a media transport assembly;
an encoder to generate a first signal in response to movement of the media transport assembly;
a memory to store a plurality of numbers to identify a subset of the first signal; and
a controller to generate a second signal in response to the first signal using the numbers,
wherein the first signal includes a plurality of first timing pulses, the second signal includes a plurality of second timing pulses, the plurality of numbers includes a plurality of pulse select numbers, and the subset of the first signal includes a subset of the first timing pulses,
wherein the controller is operable to generate the plurality of second timing pulses in response to the subset of the first timing pulses,
wherein the controller is operable to detect receipt of one of the first timing pulses of the subset in response to receipt of a number of the first timing pulses equal to one of the pulse select numbers and further being operable to generate one of the second timing pulses upon receipt of the detected one of the first timing pulses of the subset.

2. The imaging device according to claim 1, wherein the first timing pulses of the subset measure a plurality of actual distances of movement of the media transport assembly that are uniformly sized to compensate for a periodic distance error.

3. The imaging device according to claim 1, wherein a number of the first timing pulses included in the subset defines a number of pulses-per-unit-movement to compensate for a linear distance error, with the first timing pulses of the subset being uniformly distributed.

4. The imaging device according to claim 1, wherein the controller includes a counter, coupled to the encoder, to generate a pulse count of the first timing pulses received; and a comparator, coupled to the counter, to detect one of the first timing pulses of the subset when the pulse count is equal to one of the pulse select numbers and to trigger generation of one of the second timing pulses in response to the detected one of the first timing pulses of the subset.

5. The imaging device according to claim 4, wherein the counter generates an accumulative pulse count of the first timing pulses from a starting reference point of the encoder.

6. The imaging device according to claim 4, wherein the counter generates a subset pulse count of the first timing pulses received since a last one of the first timing pulses was detected to generate one of the second timing pulses.

7. The imaging device according to claim 1, wherein the controller includes a counter, coupled to the encoder, to generate a pulse count of the first timing pulses received by the controller, a comparator, coupled to the counter, to select one of the first timing pulses when the pulse count is equal to one of the pulse select numbers; and a pulse generator, coupled to the comparator, to generate one of the second timing pulses in response to the detected one of the first timing pulses.

8. The imaging device according to claim 1, further comprising:
at least one printhead; and
wherein the media transport assembly is disposed adjacent to the at least one printhead.

9. The imaging device according to claim 8, wherein the at least one printhead includes a plurality of stationary, staggered printheads disposed to traverse the media transport assembly.

10. The imaging device according to claim 9, wherein the encoder measures a plurality of distances between the plurality of printheads in a direction of the movement of the media transport assembly.

11. The imaging device according to claim 10, wherein the plurality of printheads, coupled to the controller, are adapted to print in response to the second timing pulses and the media transport assembly, coupled to the controller, moves in response to the second timing pulses.

12. An imaging device, comprising:
a media transport assembly;
an encoder to generate a first signal in response to movement of the media transport assembly;
a memory to store a plurality of numbers to identify a subset of the first signal; and
a controller to generate a second signal in response to the first signal using the numbers,
wherein the first signal includes a plurality of first timing pulses, the second signal includes a plurality of second timing pulses, the plurality of numbers includes a plurality of pulse select numbers, and the subset of the first signal includes a subset of the first timing pulses,
wherein the controller is operable to generate the plurality of second timing pulses in response to the subset of the first timing pulses,
wherein the controller is operable to select one of the first timing pulses to generate one of the second timing pulses in response to a received number of the first timing pulses being equal to one of the pulse select numbers.

13. The imaging device according to claim 12, wherein the first timing pulses of die subset measure a plurality of actual distances of movement of the media transport assembly that are uniformly sized to compensate for a periodic distance error.

14. The imaging device according to claim 12, wherein a number of the first timing pulses included in the subset defines a number of pulses-per-unit-movement to compensate for a linear distance error, with the first timing pulses of the subset being uniformly distributed.

15. The imaging device according to claim 12, wherein the controller includes a counter, coupled to the encoder, to generate a pulse count of the first timing pulses received; and a comparator, coupled to the counter, to detect one of the first timing pulses of the subset when the pulse count is equal to one of the pulse select numbers and to trigger generation of one of the second timing pulses in response to the detected one of the first timing pulses of the subset.

16. The imaging device according to claim 15, wherein the counter generates an accumulative pulse count of the first timing pulses from a starting reference point of the encoder.

17. The imaging device according to claim 15, wherein the counter generates a subset pulse count of the first timing pulses received since a last one of the first timing pulses was detected to generate one of the second timing pulses.

18. The imaging device according claim 12, wherein the controller includes a counter, coupled to the encoder, to generate a pulse count of the first timing pulses received by the controller a comparator, coupled to the counter, to select one of the first timing pulses when the pulse count is equal to one of the pulse select numbers; and a pulse generator, coupled to the comparator, to generate one of the second timing pulses in response to the detected one of the first timing pulses.

19. The imaging device according to claim 12, further comprising:
at least one printhead; and
wherein the media transport assembly is disposed adjacent to the at least one printhead.

20. The imaging device according to claim 19, wherein the at least one printhead includes a plurality of stationary, staggered printheads disposed to traverse the media transport assembly.

21. The imaging device according to claim 20, wherein the encoder measures a plurality of distances between the plurality of printheads in a direction of the movement of the media transport assembly.

22. The imaging device according to claim 21, wherein the plurality of printheads, coupled to the controller, are adapted to print in response to the second timing pulses and the media transport assembly, coupled to the controller, moves in response to the second timing pulses.

23. An imaging device, comprising:
a media transport assembly;
an encoder to generate a first signal in response to movement of the media transport assembly;
a memory store a plurality of numbers to identify a subset of the first signal; and
a controller to generate a second signal in response to the first signal using the numbers,
wherein the first signal includes a plurality of first timing pulses, the second signal includes a plurality of second timing pulses, the plurality of numbers includes a plurality of pulse select numbers, and the subset of the first signal includes a subset of the first timing pulses,
wherein the controller is operable to generate the plurality of second timing pulses in response to the subset of the first timing pulses,
wherein the encoder includes an encoder wheel operable to rotate with the movement of the media transport assembly and to generate a run-out group of the first timing pulses during a complete rotation of the encoder wheel.

24. The imaging device according to claim 23, wherein the run-out group of first timing pulses are defined to be subdivided into a plurality of sub-groups of the first timing pulses and one of the plurality of pulse select numbers specify a number of first timing pulses in each of the plurality of sub-groups.

25. The imaging device according to claim 23, wherein each of the plurality of pulse select numbers identifies one of the first timing pulses of the run-out group.

26. The imaging device according to claim 23, wherein the controller is operable to select the subset of the first timing pulses from the run-out group of the first timing pulses, based at least in part on the plurality of pulse select numbers, to generate the plurality of second timing pulses.

27. The imaging device according to claim 26, wherein the subset of the first timing determines both a number of the second timing pulses generated from the run-out group of the first timing pulses and a time of occurrence for each of the second timing pulses.

28. The imaging device according to claim 26, wherein each of the plurality of pulse select numbers identifies one of the first timing pulses to generate one of the second timing pulses.

29. The imaging device according to claim 23, wherein the encoder wheel is disposed to rotate on a moving media-carrying surface of the media transport assembly to measure the movement of the media transport assembly.

30. The imaging device according to claim 29, wherein the media carrying surface is adapted to have a media disposed thereon.

31. The imaging device according to claim 23, wherein the media transport assembly includes a conveyor belt adapted to carry a media thereon; and the encoder wheel is mounted above the conveyor belt and is adapted to rotatably engage the moving paper media.

32. The imaging device according to claim 23, wherein the media transport assembly includes at least one roller and a conveyor belt mounted on the at least one roller; and wherein the encoder wheel is axially mounted to the roller to measure the movement of the conveyor belt.

33. The imaging device according to claim 23, wherein the controller is operable to convert the run-out group of the first timing pulses to a desired number of the second timing pulses.

34. The imaging device according to claim 23, further comprising:
at least one printhead; and
wherein the media transport assembly is disposed adjacent to the at least one printhead.

35. The imaging device according to claim 34, wherein the at least one printhead includes a plurality of stationary, staggered printheads disposed to traverse the media transport assembly.

36. The imaging device according to claim 35, wherein the encoder measures a plurality of distances between the plurality of printheads in a direction of the movement of the media transport assembly.

37. The imaging device according to claim 36, wherein the plurality of printheads, coupled to the controller, are adapted to print in response to the second timing pulses and the media transport assembly, coupled to the controller, moves in response to the second timing pulses.

38. An imaging device, comprising:
a media transport assembly;
an encoder to generate a first signal in response to movement of the media transport assembly;
a memory to store a plurality of numbers to identify a subset of the first signal; and
a controller to generate a second signal in response to the first signal using the numbers,
wherein the first signal includes a plurality of first timing pulses, the second signal includes a plurality of second diming pulses, the plurality of numbers includes a plurality of pulse select numbers, and the subset of the first signal includes a subset of the first timing pulses,
wherein the controller is operable to generate the plurality of second timing pulses in response to the subset of the first timing pulses,
wherein the plurality of first timing pulses has a first resolution and the plurality of second timing pulses has a second resolution which is less than the first resolution, the first and the second resolutions being measured in pulses-per-unit-movement.

39. The imaging device according to claim 38, wherein the pulses-per-unit-movement for the second timing pulses is at least 150 lines-per-inch and the pulses-per-unit-movement for the first timing pulses is at least 1500 lines-per-inch.

40. The imaging device according to claim 38, further comprising:
at least one printhead; and
wherein the media transport assembly is disposed adjacent to the at least one printhead.

41. The imaging device according to claim 40, wherein the at least one printhead includes a plurality of stationary, staggered printheads disposed to traverse the media transport assembly.

42. The imaging device according to claim 41, wherein the encoder measures a plurality of distances between the plurality of printheads in a direction of the movement of the media transport assembly.

43. The imaging device according to claim 42, wherein the plurality of printheads, coupled to the controller, are adapted to print in response to the second timing pulses and the media transport assembly, coupled to the controller, moves in response to the second timing pulses.

44. An imaging device, comprising:
means for generating a plurality of ink swaths on a print media;
means for transporting a media past the means for generating the plurality of ink swaths;
means, coupled to the means for transporting the media, fin generating a plurality of first timing pulses having a first number of pulses-per-unit-movement in response to movement of the means for transporting the media;
means for storing a plurality of pulse select numbers to identify a subset of the plurality of first timing pulses; and
means, coupled to the means for generating the plurality of first timing pulses and the means for storing the plurality of pulse select numbers, for generating a plurality of second timing pulses in response to die first timing pulses and the pulse select numbers, the plurality of second timing pulses having a second number of pulses-per-unit-movement which is less than the first number of pulses-per-unit-movement.

45. The imaging device according to claim 44, wherein the first timing pulses of the subset of first timing pulses measure a plurality of actual distances of movement of the means for transporting the media that are uniformly sized to compensate for a periodic distance error.

46. The imaging device according to claim 44, wherein a number of the first timing pulses included in the subset of first timing pulses defines the pulses-per-unit-movement to compensate for a linear distance error, with the first timing pulses of the subset being uniformly distributed.

47. The imaging device according to claim 44, wherein the means for generating the plurality of second timing pulses is operable for generating one of the second timing pulses in response to a received number of the first timing pulses being equal to one of the pulse select numbers.

48. The imaging device according to claim 44, wherein the means for generating the plurality of second timing pulses includes means, coupled to the means for generating the plurality of first timing pulses, for generating a pulse count of the first timing pulses received and means, coupled to the means for generating the pulse count, for selecting one of the first timing pulses to generate one of the second timing pulses when the pulse count is equal to one of the pulse select numbers.

49. The imaging device according to claim 44, wherein the means for generating the plurality of second timing pulses includes means, coupled to the means for generating the plurality of first timing pulses, for generating a pulse count of the first timing pulses received; means, coupled to the means for generating the pulse count, for selecting one of the first timing pulses when the pulse count is equal to one of the pulse select numbers; and means, coupled to the means for selecting one of the first timing pulses, for generating one of the second timing pulses in response to the selected one of the first timing pulses.

50. The imaging device according to claim 44, wherein the means for generating the plurality of first timing pulses includes an encoder wheel operable to rotate with the movement of the means for transporting the media and to generate a run-out group of the first timing pulses during a complete rotation of the encoder wheel.

51. The imaging device according to claim 50, wherein the run-out group of first timing pulses is defined to be subdivided into a plurality of subgroups of the first timing pulses within the run-out group; and each of the plurality of pulse select numbers defines a number of the first timing pulses within one of the plurality of subgroups.

52. The imaging device according to claim 50, wherein each of the plurality of pulse select numbers correlates with one of the first timing pulses of the run-out group.

53. The imaging device according to claim 50, wherein the encoder wheel is disposed to rotate on a moving media-carrying surface of the means for transporting the media to measure the movement of the means for transporting the media.

54. The imaging device according to claim 50, wherein the means for transporting the media includes at least one roller and a conveyor belt mounted on the at least one roller; and wherein the encoder wheel is axially mounted to the roller to measure the movement of the conveyor belt.

55. The imaging device according to claim 44, wherein the means for generating the plurality of ink swaths includes a plurality of stationary, staggered printheads disposed to traverse the means for transporting the media.

56. The imaging device according to claim 55, wherein the encoder means is operable to measures a plurality of distances between the plurality of printheads in a direction of the movement of the means for transporting the media.

57. A method, comprising:
generating a first signal in response to movement of a media transport assembly; and
generating a second signal in response to the first signal using a plurality of numbers identifying a plurality of portions of the first signal,
wherein the generating of the first signal includes generating a plurality of first timing pulses, and the generating of the second signal includes generating a plurality of second timing pulses,
wherein the generating of the second signal includes generating one of the second timing pulses in response to response of one of the portions of the first signal, and the plurality of portions of the first signal includes a subset of first timing pulses selected from the plurality of first timing pulses,
wherein the plurality of first timing pulses has a first resolution and the plurality of second timing pulses has a second resolution which is less than the first resolution, the first and the second resolutions being measured in pulses-per-unit-movement.

58. The method according to claim 57, wherein the generating of the first signal further includes selecting the first timing pulses of the subset to measure a plurality of actual distances of movement of the media transport assembly that are uniformly sized to compensate for a periodic distance error.

59. The method according to claim 57, wherein the generating of the first signal further includes providing a number of the first timing pulses in the subset to define a number of pulses-per-unit-movement to compensate for a linear distance error, with the first timing pulses of the subset being uniformly distributed.

60. The method according to claim 57, wherein the plurality of numbers includes a plurality of pulse select numbers, wherein the generating of the second signal further includes generating a pulse count of the first timing pulses received and selecting one of the first timing pulses to generate one of the second timing pulses when the pulse count is equal to one of the pulse select numbers.

61. The method according to claim 60, wherein the generating of the pulse count includes generating an accumulative pulse count of the first timing pulses from a starting reference point of an encoder.

62. The method according to claim 60, wherein the generating of the pulse count includes generating a subset pulse count of the first timing pulses received since a last one of the first timing pulses was selected to generate one of the second timing pulses.

63. The method according to claim 57, wherein the pulses-per-unit-movement for the second timing pulses is at least 150 lines-per-inch and the pulses-per-unit-movement for the first timing pulses is at least 1500 lines-per-inch.

* * * * *

UNITED STATES PATENT AND TRADEMARK OFFICE
CERTIFICATE OF CORRECTION

PATENT NO. : 7,530,657 B2 Page 1 of 1
APPLICATION NO. : 11/051173
DATED : May 12, 2009
INVENTOR(S) : Kurt Thiessen et al.

It is certified that error appears in the above-identified patent and that said Letters Patent is hereby corrected as shown below:

In column 9, line 20, delete "62.62361126" and insert -- 62.62361726 --, therefor.

In column 15, line 64, in Claim 13, delete "die" and insert -- the --, therefor.

In column 16, line 21, in Claim 18, after "according" insert -- to --.

In column 16, line 24, in Claim 18, after "controller" insert -- ; --.

In column 16, line 52, in Claim 23, after "memory" insert -- to --.

In column 18, line 5, in Claim 38, delete "dining" and insert -- timing --, therefor.

In column 18, line 43, in Claim 44, delete "fin" and insert -- for --, therefor.

In column 18, line 53, in Claim 44, delete "die" and insert -- the --, therefor.

In column 20, line 15, in Claim 57, delete "response" and insert -- receipt --, therefor.

Signed and Sealed this

Third Day of November, 2009

David J. Kappos
*Director of the United States Patent and Trademark Office*